United States Patent [19]

Zirps

[11] Patent Number: 4,631,907

[45] Date of Patent: Dec. 30, 1986

[54] HYDRAULIC LIFTING DEVICE FOR HARVESTING MACHINES

[75] Inventor: Wilhelm Zirps, Hemmingen, Fed. Rep. of Germany

[73] Assignee: Robert Bosch GmbH, Stuttgart, Fed. Rep. of Germany

[21] Appl. No.: 702,871

[22] Filed: Feb. 19, 1985

[30] Foreign Application Priority Data

Apr. 28, 1984 [DE] Fed. Rep. of Germany ....... 3415922

[51] Int. Cl.$^4$ ............................................. A01D 69/03
[52] U.S. Cl. ................................. 56/11.9; 56/DIG. 15
[58] Field of Search ................ 56/11.9, 208, DIG. 15, 56/7, 6

[56] References Cited

U.S. PATENT DOCUMENTS

| | | | |
|---|---|---|---|
| 3,563,011 | 2/1971 | Bramley et al. | 56/7 |
| 3,808,778 | 5/1974 | Hoffmeyer et al. | 56/7 |
| 3,832,835 | 9/1974 | Hall et al. | 56/11.9 |
| 3,908,345 | 9/1975 | Oni et al. | 56/208 |
| 3,918,240 | 11/1975 | Haffner et al. | 56/11.9 |
| 3,953,959 | 5/1976 | Decroyenaere | 86/208 |
| 3,992,858 | 11/1976 | Hubbard et al. | 56/11.9 |
| 4,335,561 | 6/1982 | Swanson et al. | 56/11.9 |
| 4,337,611 | 7/1982 | Mailander et al. | 56/DIG. 15 |
| 4,384,443 | 5/1983 | Hoggstrate | 56/11.9 |

Primary Examiner—Paul J. Hirsch
Attorney, Agent, or Firm—Michael J. Striker

[57] ABSTRACT

A hydraulic lifting apparatus for harvesting machines, the apparatus having a plurality of lifting cylinders connected to the undercarriage of the harvesting machine which support a mower table so that it rests on the ground with a minimal resting weight, and also having energy storing tanks to provide different suspension of the mower table. To accomplish this a hydraulically actuatable stop valve is located in a first circuit of working lines running between a distributing slide valve and the lifting cylinders. This stop valve is actuated by a control pressure which is branched from a second circuit of working lines. The second circuit of working lines runs from the distributing slide valve over a pressure relief valve to a reservoir, and is able to be disconnected by a solenoid valve. The stop valve has a valve element with a series of bores through which the pressure set by the pressure relief valve passes through the blocked first circuit of working lines into the lifting cylinders. Thereby the mower table automatically lowers with a preselected ground bearing force or selectively without the ground bearing force.

13 Claims, 1 Drawing Figure

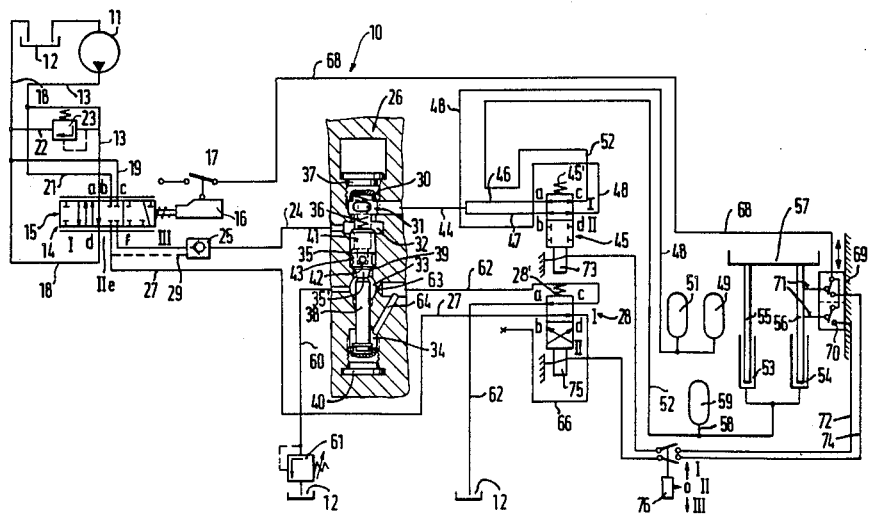

HYDRAULIC LIFTING DEVICE FOR HARVESTING MACHINES

BACKGROUND OF THE INVENTION

The invention relates to a hydraulic lifting device on harvesting machines to lift and lower a harvesting implement. A lifting apparatus is already known wherein a reference pressure corresponding to the ground bearing load of a mower table is applied against lifting cylinders via a relief valve, wherein the reference pressure is not undercut. It is thereby possible in certain constructions, that by lowered setting of the reference pressure by the actuating valves results in a momentary lifting of the mower table, thereby increasing the risk of accident.

SUMMARY OF THE INVENTION

It is an object of the invention to provide a lifting apparatus wherein a constant preselectable working height is setable by lowering of the mower table.

It is also an object of the present invention that the process of moving the mower table to the preselected working height is automatically ended upon reaching the working height.

Pursuant to these objects and others which will become apparent hereafter, in a first setting the lowering of the mower table is possible until it reaches a ground bearing load that is set by a reference pressure from a relief valve. In a second setting a lowering is possible without the reference pressure.

Through further embodiments of the invention additional advantages are made possible. In particular, a suspension of the lifting cylinder of the mower table is possible with the help of a second hydropneumatic reservoir. It is thereby possible to achieve a soft or a hard suspension of the lifting cylinder, depending upon the lowering process.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

The drawing illustrates a circuit diagram of a hydraulic lifting arrangement pursuant to the present invention.

DETAILED DESCRIPTION OF THE PREFERRED EMBODIMENTS

In a lifting arrangement 10 for a mower table of a combine, a pressure medium is driven by a pump 11 from a tank 12 along an inlet line 13 to a 6/3-distributing slide valve 14. This valve 14 has three switch settings I, II, III and three connections a, b, c on one side and connections d, e, f on the other side. The distributing side valve 14 also has a servo-piston 15 that is attached to a cam 16. In the switch settings II and III, the cam 16 opens an electric switch 17, and in the switch setting I it closes the switch 17. Furthermore, in the switch setting II the servo-piston 15 is spring centered. From connection d of the distributing slide valve 14 a return line 18 leads to the tank 12. The connection c connects a line 19 with the return line 18, and the connection b connects a line 21 with the inlet line 13. The inlet line 13 is connected to the return line 18 by a line 22 in which a relief valve 23 is located. A line 24 leads from connection f over a hydraulic presettable check valve 25 to a stop valve 26. The check valve 25 serves to cut off the line 24 from the distributing sliding valve 14. A line 27 leads from connection e of the distributing slide valve 14 to a 2/2-solenoid valve 28 with a return spring 28'. A control line 29 branches from the line 27 shortly after the connection e and leads to the check valve 25.

The stop valve 26 has a multiple recessed housing bore 30 in which four annular T-slots are provided which define a receiver chamber 31, an inlet chamber 32, a return chamber 33 and a pressure chamber 34. Between the inlet chamber 32, in which the line 24 empties, and the return chamber 33, a piston-shaped valve element 35 is slidably led. On the end of the valve element 35 removed from the inlet chamber 32, rests a spring 36. The other end of the spring 36 rests against a stopping piece or cap 37 which closes off housing bore 30. The other end of the valve element 35 has a closing cone 35' which rests against a valve seat 39 of the return chamber 33 as a result of the force of the spring 36. A piston 38 is tightly and slidably guided in the housing bore 30 between the return chamber 33 and the pressure chamber 34, and works upon the valve element 35 against the force of the spring 36. The housing bore 30 is closed on this end by a second closing piece 40. A blind bore 41 is provided centrally in the valve element 35 extending toward the closing cone 35'. A cross-drilled hole 42 empties into the blind bore 41 at the bottom of the blind bore 41. The valve element 35 has an outer circumference in which an annular T-slot 43 is provided in the area of the cross-drilled hole 42.

A line 44 extends from the receiving chamber 31 to a 2/2-solenoid valve 45 with a return spring 45'. The solenoid valve 45 has two switch settings I and II and also has connections a, b on one side and connections c, d on the other side of the switch. From one setting of the solenoid valve 45, a line 46 connects the line 44 to connection a of the solenoid valve 45 and a line 47 connects the line 44 to the connection b. The connection d is connected with two parallel connected hydropneumatic storage tanks 49, 51 by a line 48. A line 52 runs from connection c of the solenoid valve 45 to two lifting cylinders 53, 54 each provided with a lifting piston 55, 56. The lifting cylinders 53, 54 serve to raise and lower and mower table 57. A line 58 branches before the lifting cylinders 53, 54 to a third hydropneumatic storage tank 59. This suspension line is steeper than the lines of the storage tanks 49, 51.

From the return chamber 33 of the stop valve 26 runs a first line 60 in which an adjustable relief valve 61 is provided. First line 60 runs back to the reservoir 12. A second line 62 runs from the return chamber 33 to the solenoid valve 28. A throttle 63 is located in the line 62 shortly after the return chamber 33. After the throttle 63 a line 64 branches from the line 62 to the pressure chamber 34.

The solenoid valve 28 has switch settings I and II and connections a, b on one side and connections c, d on the other side. The line 62 is connected to connection c, and the line 27 is connected to the connection b. The line 62 runs from the connection a back to the reservoir 12. A closed line 66 is connected to connection d, and is also connectable with the line 27.

An electrical lead 68 of an electric circuit runs from switch 17 to two series-connected switches 69, 70 that are associated with the lifting pistons 55, 56. The switches 69, 70 are attached to the chassis of the combine so that they are accessible from the driver compartment so that they can be selectively operated to set a desired working height of the mower table 57. With the help of, for example, terminals 71 connected to the lifting piston 56, the switches 69, 70 remain in operative connection with the lifting pistons 55, 56. A lead 72 runs from the switch 70 to a magnet 73 of the solenoid valve 45, and a lead 74 runs from the switch 69 to a magnet 75 of the solenoid valve 28. A hand-actuatable multiple switch 76 with three switch settings I, II and III is connected to both leads 72 and 74. In switch setting I the lead 72 is closed, and switch setting III the lead 72 is closed and in switch setting II both leads 72 and 74 are disconnected.

When the distributing slide valve 14 finds itself in switch setting II, whereby the switch 17 is opened, the pressure medium flows from the pump 11 nearly pressureless over the inlet line 13, the distributing slide valve 14, and the return line 18 back into the reservoir 12. The check valve 25 is closed, and the solenoid valve 45 is in switch setting I because the magnet 73 is not excited. The lifting cylinders 53, 54 and the storage tanks 49, 51, 59 are closed tight from the reservoir 12 by the check valve 25. The lifting cylinders 53,54 are connected with the storage tank 59 by line 58, and are connected to the storage tanks 49, 51 by the line 52 of the solenoid valve 45, lines 46, 47 and the line 48. This results in the following: a working pressure already prevails in the lifting cylinders 53, 54, in this way the largest portion of the weight of the mower table 57 is carried by the lifting cylinders 53, 54, and thereby the mower table is relatively softly suspended over the storage tanks 49, 51 and 59.

If the distributing slide valve 14 is moved into switch setting III, the switch 17 is further opened, and the solenoid valves 28 and 45 are moved further into switch setting I. The pressure medium flows from the pump 11 over the inlet line 13, the line 21, the check valve 25, the line 24, the opened stop valve 26, the lines 44, 46, 47 of the solenoid valve 45 and the lines 48, 52 to the storage tanks 49, 51, 59 and to the lifting cylinders 53, 54. The lifting pistons 55, 56 are guided out and the mower table 57 is lifted. The lifting process is ended when the distributing slide valve 14 is returned to switch setting 2. Thereby the pump 11 is released and the check valve 25 disconnects the lifting cylinders 53, 54 from the pump 11.

When the distributing slide valve 14 is put in switch setting I, the switch 17 is closed by the cam 16. Here however the switches 69, 70 and the multiple setting switch 76 are opened and the solenoid valves 28, 45 find themselves again in their switch setting I. The working height of the mower table 57 is set manually by the driver through lowering of the mower table 57. In addition to this, the pressure medium flows from the pump 11 over the inlet line 13, the line 21, the distributing slide valve 14, the control line 29 to the check valve 25 and opens the check valve 25. The pressure medium overcomes the opening pressure of the check valve 25 and the surplus of the pressure medium flows over the line 22 and the relief valve 23 and over the return line 18 back to the reservoir 12. Now, pressure medium from the lifting cylinders 53, 54 and the storage tanks 49, 51, 59 can flow over the lines 48, 52 of the solenoid valve 45, the lines 46, 47, 44 of the stop valve 26, the line 24 and the now opened check valve 25, the distributing slide valve 14 and the line 19 to the return line 18 and back into the reservoir 12. When the desired working height is reached, the driver manually sets the distributing slide valve into the switch setting II. The check valve 25 again closes the line 24 to the distributing slide valve 14, and the selected working height of the mower table 57 remains held.

If the distributing slide valve 14 is again put in switch setting I, the switch 17 is closed. The multiple setting switch 76 is switched to the switch setting III, so that the electric lead 72 is closed. On switch 70, a desired working height of the mower table 57 is selected by sliding of the switch 70, namely the working height, that should be automatically ended by the lowering of the mower table 57. The pressure medium from pump 11, as described above, in the control line 29 and closes hydraulically the check valve 25. Pressure medium escaping from the lifting cylinders 53, 54 can again flow back to the reservoir 12 as described above.

When the working height of the lifting pistons 55, 56 as set by the switch 70 is reached, the switch 70 is closed with the help of the terminals 71. The circuit is thereby closed, so that the magnet 73 of the solenoid valve 45 is excited. The solenoid valve 45 is then set into switch setting II. Thereby the backflow of the pressure medium from the lifting cylinders 53, 54 through the lines 46, 47 to the reservoir 12, is closed. At the same time, the connection of the line 52 to the line 58 is blocked. The lifting pistons 55, 56 and therewith the the mower table 57 find themselves at the desired working height of the soil surface. At the end of the lowering movement the mower table 57 is cushioned only by the storage tank 59. The suspension through the storage tank 59 is firmer than that with the storage tanks 49, 51 together. This is necessary because the soft suspension of the mower table would allow the mower table to strike hard against the soil surface. However, a soft suspension is necessary for mowing along the soil surface. If the distributing slide valve 14 is set back into switch setting II the selected working height of the mower table 57 is held. If the distributing slide valve 14 finds itself in switch setting I, the switch 17 is closed. The multiple setting switch 76 is now moved into switch setting I so that the electric lead 74 is connected. By a switch 69 the desired working height of the mower table 57 over the soil surface, for example, 200 mm, is set. At this working height certainly the mower table 57 lies upon the soil surface, however, the major portion of the weight of the mower table 57 is supported by the lifting cylinders 53, 54. The mower table 57 thereby lays on the soil surface with a small ground bearing force and follows all unevenness of the soil surface only with the adjusted weight. Any unevenness occuring in the soil surface is compensated for by the soft suspension with the help of the storage tanks 49, 51, 59. The ground bearing force is asserted against a reference pressure selected in the relief valve 61. The pressure medium flows from the pump again, as described above, in the control line 29 and opens the check valve 25. The pressure medium from the lifting cylinders 53, 54 and the storage tank 49, 51, 59 flows over the opened stop valve 26 in the opened check valve 25 back into the reservoir 12. If the working height selected by the switch 69 is reached, the switch 69 is closed with the help of the terminal 71, and the electric leads 68 and 74 are connected. The magnet 75 of the solenoid valve 28 is excited so that the solenoid valve is switched into switch setting II. A pressure medium flowing from the pump 11 can now flow over the control line 29 to the check valve 25 as well as over the line 27 into the line 62. From there the pressure medium reaches over the throttle 63, the return chamber 33 and the line 60 to the pressure relief valve 61. So long as the reference pressure set in the pressure relief valve 61 is higher than the pressure of the pressure medium in the line 60, no pressure medium flows further back into the reservoir 12. The pressure medium flows from the line 62 over the line 64 into the pressure chamber 34, so that the pressure let off from the throttle 63 is able to influence the piston 38. So long as pressure medium still flows out of the lifting cylinders 53, 54 into the reservoir 12, the bearing pressure on the valve element 35 is higher than the pressure working on the piston 38 which is fixed from the reference pressure of the pressure relief valve 61.

If the mower table 57 now lays on the soil surface and the pressure in the lifting cylinders 53, 54 has lowered to the reference pressure of the pressure relief valve 61, the piston 38 and with it the valve element 35 is lifted from the valve seat 39 by the working pressure in the pressure chamber 34. The inlet chamber 32 is thereby closed, so that no more pressure medium can flow from the lifting cylinders 53, 54 and from the storage tanks 49, 51, 59 to the reservoir 12, notwithstanding the opened check valve 25. At the same time however, the return chamber 33 of the stop valve 26 is connected with the storage tanks 49, 51, 59 and the lifting cylinders 53,54 by way of the blind bore 41, the cross-drilled hole 42 and the now opened valve seat 39. The reference pressure of the pressure relief valve 61 prevails in the return chamber 33, and therewith works also the reference pressure in the lifting cylinders 53, 54 in the storage tanks 49, 51, 59. A further lowering of the working pressure in the lifting cylinders 53, 54 under the reference pressure is prevented. The reference pressure is thereby selected to be so large that the largest portion of the weight of the mower table 57 is braced by the lifting cylinders 53, 54 and only a small residual weight is placed against the earth. This remaining ground bearing force is also dependent upon the difference between the weight of the mower table 57 and the reference pressure on the pressure relief valve 61.

If now the distributing slide valve 14 is again set in switch setting II the check valve 25 is closed. No more pressure medium flows in line 27 and in line 62 so that the pressure on the piston 38 is reduced. The connection of the receiver chamber 31 to the inlet chamber 32 is once again opened, due to the valve element 35 sliding onto the valve seat 39. With the help of the cam 16 the switch 17 is opened so that the magnet 75 of the solenoid valve 28 is no longer excited. The solenoid valve 28 returns thereby to its switched setting I. The pressure adjust the number of lifting cylinders 53, 54, which now corresponds with the reference pressure, is maintained by way of the storage tanks 49, 51, 59. The ground bearing force of the mower table 57 only varies within the suspension range of the storage tanks 49, 51, 59. Since these are relatively soft, namely having a flat characteristic, the variations are lowered. The mower table 57 can thereby slide along the soil surface without the need for additional corrections from the driver.

Without changing the function of the invention, it is also possible, that the stop valve 26 can be constructed as a mechanical or electromagnetically actuated 2/2- distributing slide valve. The magnet of the electromagnetically actuated valve can thereby be connected to the line 74.

While the invention has been illustrated and described as embodied in a hydraulic lifting apparatus for a harvester, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A hydraulic lifting apparatus for a harvesting machine having an undercarriage and a harvesting implement having weight, to raise and lower the harvesting implement, the lifting apparatus comprising: at least one lifting cylinder located between the harvesting implement and the undercarriage of the harvesting machine, said lifting cylinder having a lifting piston connected to the harvesting implement that bears a major portion of the weight of the harvesting implement; pump means for pumping a pressure medium; a first storage means for storing said pressure medium; a valve means for controlling a flow of pressure medium from said pump to said lifting cylinder; a first circuit of working lines for said flow of pressure medium, said circuit connecting said lifting cylinder to said valve means; at least one pressure medium storage tank arranged for suspension of the harvesting implement; a pressure line for said pressure medium, connecting said pumping means to said valve means; a reservoir for storing said pressure medium; a second circuit of pressure medium working lines running from said pressure line connecting said valve means to said reservoir; a pressure relief valve means connected in said second circuit of working lines so as to provide a pressure in said lifting cylinder; at least one stop valve means connected in said first circuit of working lines and said second circuit of working lines so that said pressure of said cylinder which is governed by said pressure relief valve means is connectable to said stop valve; and a switching valve means connected in said second circuit of working lines, said pressure relief valve means having a control pressure, said stop valve being closeable by said control pressure so that said first circuit of working lines is blocked and said control pressure is carried over siad switching valve in said second circuit of working lines to said stop valve.

2. Hydraulic lifting apparatus as defined in claim 1, wherein said valve means includes a distributing slide valve.

3. Hydraulic lifting apparatus as defined in claim 1, wherein said switching valve means has a first working position in which said second circuit of working lines is blocked, and a second working position in which said second circuit of working lines is connected with said stop valve means.

4. Hydraulic lifting apparatus as defined in claim 1, wherein said stop valve means includes a return chamber located in said second circuit of working lines and having a valve seat formed therein, a spring-loaded valve element provided so as to be able to block said first circuit of working lines and to be seatable on said valve seat, and a piston for upwardly moving said valve element in response to said control pressure produced by said pressure relief valve means, said valve element having a plurality of bores through which said pressure of said pressure relief valve means works on said lifting cylinder.

5. Hydraulic lifting apparatus as defined in claim 1, wherein said stop valve means has an outlet side; and further comprising a second switching valve means connected to said outlet side of said stop valve means, and at least a second storage tank connected in parallel with said one storage tank to said second switching valve means.

6. Hydraulic lifting apparatus as defined in claim 5; and further comprising a working line connecting said second switching valve means with said second storage tank, said second switching valve means having a first working setting and a second working setting, said first working setting connecting said second storage tank with said lifting cylinder, and said second working setting blocking said first circuit of working lines and said working line to said second storage tank.

7. Hydraulic lifting apparatus as defined in claim 6, wherein said first and said second switching valve means are a first and a second solenoid valve, respectively, said first solenoid valve and said second solenoid valve having a first magnet and a second magnet, respectively, said valve means including a servo piston; and further comprising an electrical circuit including an electrical switch means activatable by said servo piston, at least two switches activatable by said lifting piston and one manually activatable multiposition switch, said first and said second magnet lying in said electrical circuit.

8. Hydraulic lifting apparatus as defined in claim 7, wherein said two lifting piston actuatable switches are a first switch and a second switch, said first switch connected in series to said second switch, said electrical circuit further including a first electrial lead running from said first switch to said first magnet of said first solenoid valve, and a second electrical lead running from said second switch to said second magnet of said second solenoid valve.

9. Hydraulic lifting apparatus as defined in claim 8, wherein said multi-position switch is connected in said electrical circuit so as to selectively close said first electrical lead or said second electrical lead or disconnect both said first and said second electrical leads.

10. Hydraulic lifting apparatus as defined in claim 1, wherein said stop valve means is an electromagnetically activated 2/2-distributing valve.

11. Hydraulic lifting apparatus as defined in claim 1, wherein said stop valve means is a mechanically activated 2/2-distributing valve.

12. A hydraulic lifting apparatus for a harvesting machine having an undercarriage and a harvesting implement having weight, to raise and lower the harvesting implement, the lifting apparatus comprising: at least one lifting cylinder located between the harvesting implement and the undercarriage of the harvesting machine, said lifting cylinder having a lifting piston connected to the harvesting implement that bears a major portion of the weight of the harvesting implement; pump means for pumping a pressure medium; a first storage means for storing said pressure medium; a valve means for controlling a flow of pressure medium from said pump to said lifting cylinder; a first circuit of working lines for said flow of pressure medium, said circuit connecting said lifting cylinder to said valve means; at least one pressure medium storage tank arranged for suspension of the harvesting implement; a pressure line for said pressure medium, connecting said pumping means to said valve means; a reservoir for storing said pressure medium; a second circuit of pressure medium working lines running from said pressure line connecting said valve means to said reservoir; a pressure relief valve means connected in said second circuit of working lines so as to provide a pressure in said lifting cylinder; at least one stop valve means connected in said first circuit of working lines and said second circuit of working lines so that said pressure of said cylinder which is governed by said pressure relief valve means is connectable to said stop valve, said stop valve means including a pressure chamber; a branch line connecting said pressure chamber to said second circuit of working lines; and a throttle located in said second circuit of working lines between said stop valve means and said branch line.

13. A hydraulic lifting apparatus for a harvesting machine having an undercarriage and a harvesting implement having weight, to raise and lower the harvesting implement, the lifting apparatus comprising: at least one lifting cylinder located between the harvesting implement and the undercarriage of the harvesting machine, said lifting cylinder having a lifting piston connected to the harvesting implement that bears a major portion of the weight of the harvesting implement; pump means for pumping a pressure medium; a first storage means for storing said pressure medium; a valve means for controlling a flow of pressure medium from said pump to said lifting cylinder; a first circuit of working lines for said flow of pressure medium, said circuit connecting said lifting cylinder to said valve means; at least one pressure medium storage tank arranged for suspension of the harvesting implement; a pressure line for said pressure medium, connecting said pumping means to said valve means; a reservoir for storing said pressure medium; a second circuit of pressure medium working lines running from said pressure line connecting said valve means to said reservoir; a pressure relief valve means connected in said second circuit of working lines so as to provide a pressure in said lifting cylinder; at least one stop valve means connected in said first circuit of working lines and said second circuit of working lines so that said pressure of said cylinder which is governed by said pressure relief valve means is connectable to said stop valve; and a presettable check valve means located in said first circuit of working lines for protecting said lifting cylinder, said check valve means being closeable by a control pressure which is diverted from said second circuit of working lines.

* * * * *